United States Patent

[11] 3,607,861

[72] Inventors Oskar Braun
Frankfurt am Main;
Reinhold Deubel, Kelkheim, Taunus, both of Germany
[21] Appl. No. 702,184
[22] Filed Feb. 1, 1968
[45] Patented Sept. 21, 1971
[73] Assignee Farbwerke Hoechst Aktiengesellschaft Vormals Meister Lucius & Bruning Frankfurt am Main, Germany
[32] Priority Feb. 4, 1967
[33] Germany
[31] F 51442

[54] PROCESS FOR THE PREPARATION OF WATER-INSOLUBLE AZO-DYESTUFFS
7 Claims, No Drawings

[52] U.S. Cl. ................................................. 260/176,
96/33, 96/563, 260/144, 260/570.9, 260/583 D, 260/606.5 P
[51] Int. Cl. ...................................................... C09b 35/04, G03f 7/100

[50] Field of Search............................................ 260/144, 160, 176, 178, 193, 203, 204, 205, 206, 207, 207.1

[56] References Cited
UNITED STATES PATENTS

| | | | |
|---|---|---|---|
| 2,169,976 | 8/1939 | Guenther et al. | 260/583 X |
| 2,261,626 | 11/1941 | Lang | 260/193 |
| 2,938,897 | 5/1960 | Armento | 260/176 X |
| 3,120,508 | 2/1964 | Braun et al. | 260/160 X |
| 3,215,741 | 11/1965 | Chadwick | 260/583 |
| 3,325,546 | 6/1967 | Hays | 260/606.5 |

Primary Examiner—Floyd D. Higel
Attorney—Curtis, Morris & Safford

ABSTRACT: Process for the preparation of a water-insoluble azo-dyestuff having particularly good qualities for printing by adding in the coupling process an auxiliary comprising a mixture consisting essentially of a primary aliphatic amine and/or a salt thereof with a low-molecular weight fatty acid, and of an aminoxide or phosphine oxide which contains a long-chained hydrocarbon radical.

PROCESS FOR THE PREPARATION OF WATER-INSOLUBLE AZO-DYESTUFFS

In recent years, a fundamental change has been observed in the art of graphic printing. With a view to increasing the production capacity, more and more fast running printing machines are used, a fact which causes at the same time a considerable increase in the requirements that printing inks and the pigments incorporated in these inks have to meet. The pigments have to meet above all two demands: the azo-dyestuff must have as high a tinctorial power as possible and at the same time particularly good rheologic properties, so as to obtain, considering the low transfer of printing ink by the color furnisher in fast running machines, still intense prints. The standard pigments hitherto used for printing inks no longer meet these steadily growing demands. Attempts are therefore made to prepare water-insoluble azo-dyestuffs of high tinctorial power and good rheologic properties by modifying the conditions of manufacture and by the use of suitable additives.

Thus, for example, in Belgian Pat. No. 660,978 a process for the manufacture of easily dispersible pigments showing an increased stability of flocculation is described, wherein there are added to the pigment moistened with water 8 to 25 percent of a long-chained aliphatic amine or a corresponding salt, which salt being converted completely or to a large extent into the free amine prior to filtering and drying of the pigment. According to the Examples 1 to 4 of said Specification, which concern azo pigments, the amines or the amine salts are added only after coupling has been carried through and the coupling mixtures, before adding the amines, have been heated for several hours to temperatures ranging from 70° to 90° C. After addition of the amines the temperature of the mixture is maintained for several hours at 80° to 90° C. The pigments thus obtained show, especially in the yellow series, a clear shifting from bright greenish to intense reddish shade, in comparison with pigments prepared without amines.

Furthermore, U.S. Pat. No. 3,120,508 publishes a process for the manufacture of water-insoluble azo-dyestuffs of high tinctorial strength according to which small amounts of surface-active salts of primary aliphatic amines with carboxylic acids are added during the coupling process, whereafter coupling is carried out as usual. Though pigments of high tinctorial strength can be prepared by this process, the azo-dyestuffs thus obtained do not meet the demands of today as to their rheological properties in the printing inks.

It has now been found that it is possible to prepare water-insoluble azo-dyestuffs having particularly good qualities for printing by adding in the coupling process a mixture of aliphatic amines and/or the corresponding salts, and of a long-chained hydrocarbon radical containing amine oxides or phosphine oxides in quantities of 1 to 35 percent, preferably of 3 to 17 percent, referred to the weight of the dyestuff. The mixing proportion of the aliphatic amine and/or its salt and the amine oxide or phosphine oxide in the auxiliary agent used may vary within wide limits. Thus, according to the process of the present invention, auxiliaries are used, the mixing proportion of which of aliphatic fatty amine and/or its salt lies between 95 and 50 parts by weight, preferably between 95 and 70 parts by weight, and of amine oxide or phosphine oxide, complementary each time to 100 between 5 and 50 parts by weight, preferably between 5 and 30 parts by weight.

By adding, according to the process of the present invention, the aforementioned mixtures of auxiliaries in the coupling process, dyestuffs can be obtained, having particularly good properties for printing, that means, the printing inks made therefrom have an extraordinary fluid consistency which proves extremely favorable at the very rapid printing speed. Thus, dyestuffs which normally cannot be used for graphics or only to a limited extent can be converted, according to the process of the present invention, into inks having good printing properties and thus being generally applicable even in this field. Besides excellent rheologic properties the dyestuffs thus obtained have a distinctly higher tinctorial power compared to those products obtained without the aforementioned additions, and without there being any important shifting of shade, for instance in the yellow series from the bright pure greenish to an intense reddish tint. The dyestuffs have the further advantage of being more lustrous and more transparent. Suitable aliphatic amines are, in the first instance, compounds of the formula $$H-A-[NH(CH_2)_p]_m-NH_2$$

in which A represents a direct linkage or the radical $C_nH_{2n}$ or $C_nH_{2n-2}$, $n$ represents zero or a number from 7 to 22, $m$ is zero or a number from 1 to 6 and $p$ represents the number 2 or 3, but $n$ and $m$ may not be zero at the same time. Mixtures of the above-mentioned amines may also be used. It is often of advantage to use the amines together with amine salts, preferably with the salts of these amines with low molecular weight fatty acids, such as formic acid, acetic acid, propionic acid, lactic acid or oleic acid.

As amines there may be used in the mixing components of the auxiliary, according to the present invention, for example capryl amine, lauryl amine, palmityl amine, stearyl amine, oleyl amine, arachyl amine, behenyl amine as well as tallow fat amines and coconut oil amines obtainable from fatty acid mixtures occurring in nature. As di- and polyamines, there may be mentioned for example ethylene diamine, propylene diamine, tallow fat ethylene diamine, tallow fat propylene diamine, coconut oil ethylene diamine, stearyl triethylene tetramine, diethylene triamine, pentaethylene hexamine and dipropylene triamine.

As aminoxides or phosphine oxides, there may be mentioned, according to the present invention, compounds of the general formula $$R_2-\overset{\overset{R_1}{|}}{X}\longrightarrow O \\ \underset{R_3}{|}$$

wherein X represents a nitrogen or phosphorus atom, $R_1$ represents a hydrocarbon radical containing a long aliphatic chain, $R_2$ and $R_3$ each represent alkyl, cycloalkyl, aryl or aralkyl radicals. The radical $R_1$ may represent an aliphatic hydrocarbon radical in a straight or branched chain, containing 8 to 22 carbon atoms and, if desired, one or several double linkages. $R_1$ may furthermore represent an aromatic radical with at least one aliphatic side chain of about 4 to 12 carbon atoms. The radicals $R_2$ and $R_3$ can be identical or different and, if desired, they can also contain substituents, such as for example, halogen atoms, hydroxyalkyl or polyalkylene ether groups. The radicals $R_2$ and $R_3$ preferably represent alkyl radicals containing 1 to 5 carbon atoms. There may, however, also be mentioned compounds in which one of the radicals $R_2$ or $R_3$ contains a long aliphatic chain. Such compounds thus contain two hydrocarbon radicals with a long aliphatic chain in the molecule.

As mixing components of the aminoxide or phosphine oxide series suitable for the process of the present invention, there may be mentioned for example: dodecyl-dimethyl-aminoxide, oleyl-diethyl-aminoxide, lauryl-methyl-ethyl-aminoxide, coconut oil dimethyl-aminoxide, coconut oil-dipropyl-aminoxide, coconut oil methyl-benzyl-aminoxide, oleyl-propyl-methyl-aminoxide, dodecyl-ethyl-cyclohexyl-aminoxide, tallow fat dimethyl-aminoxide, dodecyl-dimethyl-phosphine-oxide, dodecyl-diethyl-phosphine-oxide, dodecyl-methyl-ethyl-phosphine-oxide, dodecyl-methyl-benzyl-phosphine-oxide, oleyl-dimethyl-phosphine-oxide, oleyl-dibenzyl-phosphine-oxide, tallow fat-dimethyl-phosphine-oxide and coconut oil diethyl-phosphine-oxide.

The process of the present invention can be applied to the manufacture of known water-insoluble azo-dyestuffs. For example, azo dyestuffs of the following groups may be mentioned:

Azo pigments of the ice color series without solubilizing groups which are formed by reaction of mono- or polyvalent bases as diazo components with coupling components, for example, aromatic hydroxy compounds, e.g. β-hydroxynaphthalene, or hydroxyaryl-carboxylic acid arylides, for example, 0-hydroxy-anthracene carboxylic acid anilide or coupling components which are derived from carbazole or benzocarbazole, or acetoacetyl-amino compounds which can be enolized or pyrazolones.

The mixtures of aliphatic mines and/or their salts and of a long chain hydrocarbon radical containing aminoxides or phosphine oxides used as auxiliary according to the present invention can be added in any stage of the coupling, whereby the single components can be mixed previously to their being added, or they can be added separately one after the other or at different intervals. Thus, the additives can be incorporated for example into the solution or dispersion of the diazo component or they can be added simultaneously with the diazo component, but separately, to the coupling component. Furthermore, the mixtures of the auxiliary can be added to the precipitating acid, for instance, acetic acid, by which the coupling component having dissolved under alkaline conditions, is precipitated. It is also possible, to add the mixtures used according to the process of the present invention, only after precipitation of the coupling component or at a later stage of the coupling process, such as for instance during the heating operation. Likewise, for example, the aliphatic amine and/or its salt can be added to the coupling component previously to the addition of the diazo component and the aminoxide or phosphine oxide may be added later in the course of the coupling, as for instance during the heating up. Another possibility consists in adding the aminoxide or phosphine oxide first, that is to the suspension of the coupling component, and in proceeding with the aliphatic amine or its salt in a later period of coupling, for example during the heating operation. According to the process of the present invention, the mixed compounds of the auxiliary can be added either in form of an aqueous emulsion, or dissolved in an organic acid, such as for example acetic acid, or even molten to the coupling liquor at elevated temperature of, for example, 60° C. The pigment dyestuff obtained frequently in a fine, difficulty filterable dispersion can be converted into a well filterable form, when aqueous alkalies are added to the coupling suspension prior to filtration.

The following Examples illustrate the invention, but they are not intended to limit it thereto. The parts and percentages being by weight unless otherwise stated.

EXAMPLE 1

A tetrazonium salt solution prepared in known manner from 76 parts of 3,3'-dichloro-4,4'-diamino-diphenyl is added dropwise, within 2 hours, to a coupling component, which was obtained by dissolving 111 parts of acetoacetylamino-benzene in 3,000 parts of water and 114.5 parts of a 33 percent sodium hydroxide solution and precipitated by addition of 63 parts of acetic acid. The coupling mixture is then heated to boil within 45 minutes. As soon as the temperature attains 60° C., a mixture heated to 65° C. and consisting of 27.2 parts of tallow fat propylene diamine and 10.0 parts of an aqueous solution of coconut oil dimethyl-aminoxide of 30.4 percent strength is added. The whole is boiled for 15 minutes, cooled with water to 80° C. and then 150 parts of a 33 percent sodium hydroxide solution are added. After having stirred for 10 minutes more, the product is filtered, washed to neutral and the dyestuff is dried at 60° C. and ground subsequently, as usual.

The test for suitability for industrial application of the dyestuff thus obtained is carried out with a commercial intaglio printing varnish based on a phenol resin and toluene and having a solid matter content of 50 percent. The printing ink which consists of 12.5 percent of azo-dyestuff, 22.5 percent of toluene and 65 percent of the above-mentioned varnish is ground for 15 minutes at a speed of 400 rev./min. in an attritor, the grinding unit of which having a diameter of 3 mm. The printing ink thus prepared is highly fluid, that means it can be poured quickly from a beaker. A printing ink prepared in analogous manner with a pigment which had not been coupled with the additives according to the present invention is, on the contrary, highly viscous and strongly thixotropic and cannot be poured from an inverted bottle.

In order to determine the tinctorial strength, the printing ink described is blended with a white titanium dioxide intaglio printing ink in a manner such that the colored and white pigments are present in a ratio of 1:20. The printing ink thus prepared is printed on an intaglio printing machine. For determining the intensity of the prints, the prints are compared with a color intensity scale. As comparative pigments for this scale a disazo dyestuff is used being prepared without applying the additives according to the process of the present invention. This test proves that the intensity of the prints obtained with the disazo dyestuff treated according to the process of the present invention is distinctly higher and in a clear greenish shade when compared to the intensity of prints obtained with an untreated dyestuff.

EXAMPLE 2

If in Example 1 the mixing proportion of the auxiliary is changed in favor of the aminoxide, that means if a mixture consisting of 14.1 parts of tallow fat propylene diamine and 47 parts of an aqueous solution of coconut oil dimethyl-aminoxide of 30 percent strength is used instead of the mixture described, the intensity of shade achieved with the printing inks prepared with the dyestuff according to the present invention is even higher, the good rheologic properties being the same.

EXAMPLE 3

When using in Example 1, instead of the mixture of the auxiliary described, a mixture consisting of 15 parts of tallow fat propylene diamine and 15.8 parts of an aqueous solution of coconut oil dimethyl-aminoxide of 30.4 percent strength, the product thus obtained yields a further increase of the tinctorial strength without the good rheologic properties of the printing inks prepared therefrom being impaired.

Furthermore, one may proceed with the auxiliary according to the present invention in such manner that the components of the mixture are applied one after another, thus, that the 15.8 parts of an aqueous solution of coconut oil dimethyl-aminoxide of 30.4 percent strength are added, for example, to the precipitated coupling component prior to the addition of the tetrazonium salt solution, whereas the 15 parts of tallow fat propylene diamine are introduced in the coupling mixture during the heating operation at 60° C.

EXAMPLE 4

Instead of the mixture of the auxiliary mentioned in Example 1 there may be added, during the inflow of the tetrazonium salt solution to the coupling component, a 5 percent aqueous solution of 15 parts of coconut oil aminacetate and subsequently a mixture consisting of 13.5 parts of tallow fat propylene diamine and 1.5 parts of coconut oil dimethyl-aminoxide in form of a 10 percent aqueous emulsion.

EXAMPLE 5

Tetrazotization and coupling is carried out as described in Example 1. A mixture heated to 65° C. and consisting of 22.8 parts of tallow fat propylene diamine and 76 parts of a 10 percent aqueous solution of dodecyl-dimethyl-phosphine oxide is added to the coupling mixture during the heating operation, prior to boiling at 60° C. Further working procedure corresponds to that described in Example 1.

The dyestuff obtained by this method has practically the same good colouristic properties, such as tinctorial strength and shade, and rheologic qualities as the product obtained according to Example 1.

Instead of the dodecyl-dimethyl-phosphine oxide there may be used as mixing component with the fat amines in the auxiliaries according to the present invention, equivalent quantities of the following phosphine oxides having practically the same effect, such as for instance coconut oil diethyl-phosphine-oxide, olely-dimethyl-phosphine-oxide, tallow fat dimethyl-phosphine-oxide.

EXAMPLE 6

A tetrazonium salt solution prepared in known manner from 253 parts of 3,3'-dichloro-4,4'-diamino-diphenyl is allowed to flow, within 2 hours, to a coupling component, which was prepared by dissolving 390 parts of 1-(acetoacetylamino)-2-methyl-benzene in 8,000 parts of water and 382 parts of a 33 percent sodium hydroxide solution. Then, 56 parts of an aqueous solution of coconut oil dimethyl-aminoxide of 30.4 percent strength, diluted with water in a ratio of 1:1 are added. The coupling component is subsequently precipitated by adding 210 parts of acetic acid. When coupling is terminated, the mixture is after-stirred for 15 minutes and heated, within 1 hour, to boil. As soon as the temperature attains 60° C., 95 parts of tallow fat propylene diamine are added. The whole is boiled for 15 minutes, cooled with water to 80° C. and then 449 parts of a 33 percent sodium hydroxide solution are added. After having stirred for another 10 minutes, the product is filtered, washed to neutral and the dyestuff is dried at 60° C.

The dyestuff thus obtained produces, when incorporated in a commercial intaglio printing ink and blended with titanium dioxide—as described in Example 1—and printed on an intaglio printing machine, prints having an essentially higher tinctorial strength and distinctly greener, purer shades than those prints, obtained by a same dyestuff prepared, however, without addition of coconut fat dimethyl-aminoxide and tallow fat propylene diamine.

Another important advantage of a pigment prepared according to the foregoing Example is that the intaglio printing inks made therefrom have a far better flowability compared to a pigment coupled without the aforementioned additives.

The same good result is obtained when, instead of the aforementioned additions, at 60° C. during the heating operation a mixture heated to 65° C. is added which consists of 95 parts of tallow fat propylene diamine and 31.5 parts of an aqueous solution of coconut oil dimethyl-aminoxide of 30.4 percent strength. The procedure continues as described before.

We claim:

1. In a process for preparing a water-insoluble azo-dyestuff by coupling a diazonium compound component and a coupling compound component in a coupling mixture thereof, the improvement which comprises adding to said coupling mixture an auxiliary mixture consisting essentially of (1) from about 95 to about 50 parts by weight of a primary aliphatic amine of the formula $$H-A-[NH(CH_2)_p]_m-NH_2$$

in which $A$ is $-C_nH_{2n}-$ or $-C_nH_{2n-2}-$, $n$ is zero or an integer from 7 to 22, $m$ is zero or an integer from 1 to 6, $p$ is an integer 2 or 3, provided the sum of $n$ and $m$ is greater than zero, or an acid addition salt of said primary amine and a low molecular weight carboxylic acid of the group consisting of formic, acetic, propionic, lactic and oleic acids, (2) from about 5 to about 50 parts by weight of an aminoxide or a phosphinoxide that contains (a) one group that is a saturated or an olefinic aliphatic hydrocarbon of 8 to about 22 carbon atoms, or is phenyl or benzyl substituted by a saturated or an olefinic aliphatic hydrocarbon of 4 to about 12 carbon atoms, (b) one group that is an alkyl of 1 to 5 carbon atoms, cyclohexyl, phenyl, benzyl, or a saturated or an olefinic aliphatic hydrocarbon of 8 to 22 carbon atoms, and (c) one group that is an alkyl of 1 to 5 carbon atoms, cyclohexyl, phenyl or benzyl, said auxiliary mixture being used in an amount of from about 1% to about 35% by weight of the azodyestuff of said coupling mixture.

2. A process according to claim 1 wherein said auxiliary mixture is used in an amount of from about 3 percent to about 17 percent.

3. A process according to claim 1 wherein said auxiliary mixture contains from about 95 to about 70 parts of component (1) and from about 5 to about 30 parts of component (2).

4. A process according to claim 1 wherein said aminoxide or phosphinoxide is of the formula

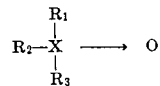

in which X is a nitrogen or phosphorus atom, $R_1$ is an alkyl or alkenyl group of 8 to 22 carbon atoms, and $R_2$ and $R_3$ each is an alkyl of 1 to 5 carbon atoms, cyclohexyl, phenyl or benzyl group.

5. A process according to claim 1 wherein said aminoxide contains one alkyl group of 8 to 22 carbon atoms and two alkyl groups each of 1 to 5 carbon atoms.

6. A process according to claim 1 wherein said phosphinoxide contains one alkyl group of 8 to 22 carbon atoms and two alkyl groups each of 1 to 5 carbon atoms.

7. A process according to claim 1 wherein said amine (1) is capryl-, lauryl-, palmityl-, stearyl-, oleyl-, arachyl-, behenyl-, tallow fat or coconut oil amine, ethylene-, propylene-, tallow fat ethylene-, tallow fat propylene- or coconut oil ethylene-diamine, diethylene- or dipropylene-triamine, stearyl-triethylene-tetramine or pentaethylene-hexamine, and said oxide (2) is dodecyl-dimethyl-, oleyl-diethyl-, lauryl-methyl-ethyl-, coconut oil-dimethyl-, coconut oil-dipropyl-, coconut oil-methyl-benzyl-, oleyl-propyl-methyl-, dodecyl-ethyl-cyclohexyl-or tallow fat-dimethyl-aminoxide or dodecyl-dimethyl-, dodecyl-diethyl-, dodecyl-methyl-ethyl-, dodecyl-methyl-benzyl-, oleyl- dimethyl-, oleyl-dibenzyl-, tallow fat-dimethyl- or coconut oil-diethyl-phosphinoxide.